US010401968B2

(12) United States Patent
Shimotono et al.

(10) Patent No.: US 10,401,968 B2
(45) Date of Patent: Sep. 3, 2019

(54) DETERMINING DIGIT MOVEMENT FROM FREQUENCY DATA

(71) Applicant: LENOVO (Singapore) PTE. LTD., New Tech Park (SG)

(72) Inventors: Susumu Shimotono, Hadano (JP); Yasushi Tsukamoto, Yamato (JP); Jun Luo, Yokohama (JP); Hiroshi Itoh, Sagamihara (JP); Ryohta Nomura, Yamato (JP)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 117 days.

(21) Appl. No.: 15/281,049

(22) Filed: Sep. 29, 2016

(65) Prior Publication Data

US 2017/0090590 A1 Mar. 30, 2017

(30) Foreign Application Priority Data

Sep. 29, 2015 (JP) ................................. 2015-191532

(51) Int. Cl.
  *G06F 3/0346* (2013.01)
  *G04G 21/00* (2010.01)
  (Continued)

(52) U.S. Cl.
  CPC .............. *G06F 3/017* (2013.01); *G04G 21/00* (2013.01); *G04G 21/02* (2013.01); *G06F 3/014* (2013.01); *G06F 3/0346* (2013.01); *G04G 21/025* (2013.01)

(58) Field of Classification Search
  CPC ...... G04G 21/025; G04G 21/00; G04G 21/02; G06F 3/017; G06F 3/014; G06F 3/0346;
  (Continued)

(56) References Cited

U.S. PATENT DOCUMENTS 4,669,477 A * 6/1987 Ober .................. A61N 1/36017
  600/590
6,647,359 B1 * 11/2003 Verplank .................. G10H 3/12
  381/119
(Continued)

FOREIGN PATENT DOCUMENTS

| EP | 2733578 A2 * | 5/2014 | ............. G06F 3/041 |
| JP | 2002358149 A | 12/2002 | |
| JP | 2006133932 A | 5/2006 | |
| WO | 2005/121939 A2 | 12/2005 | |
| WO | 2012/114216 A1 | 8/2012 | |
| WO | WO-2015199747 A1 * | 12/2015 | ............. G06F 1/163 |

OTHER PUBLICATIONS

Maruyama, Takao. "Written Submission of Certificate concerning Exception to Lack of Novelty." JPO Patent Application No. 2015-191532. Oct. 16, 2015.*

(Continued)

*Primary Examiner* — Julie Anne Watko
(74) *Attorney, Agent, or Firm* — Kunzler Bean & Adamson

(57) ABSTRACT

For indirect determination of digit movement, apparatus, methods, and computer program products are disclosed. The apparatus for indirect determination of finger movement includes a processor and a memory that stores code executable by the processor. The processor obtains frequency data corresponding to movement of a user's limb, extracts frequency data having a predetermined feature value from the measured frequency data; and determines from the extracted frequency data whether the movement of the limb corresponds to a predetermined digit motion.

20 Claims, 5 Drawing Sheets

(51) Int. Cl.
*G04G 21/02* (2010.01)
*G06F 3/01* (2006.01)
(58) Field of Classification Search
CPC .......... G06F 3/0334; G06F 3/033; G06F 3/03; G06F 3/011; G06F 3/01; G06F 3/00
See application file for complete search history.

(56) References Cited

U.S. PATENT DOCUMENTS

| | | | | |
|---|---|---|---|---|
| 6,898,299 | B1* | 5/2005 | Brooks | G06K 9/00 340/5.52 |
| 2004/0243342 | A1* | 12/2004 | Rekimoto | G06F 3/011 702/150 |
| 2006/0184059 | A1* | 8/2006 | Jadidi | A61B 5/04015 600/546 |
| 2009/0082829 | A1* | 3/2009 | Panken | A61B 5/7475 607/45 |
| 2010/0066664 | A1* | 3/2010 | Son | G06F 1/163 345/156 |
| 2017/0215768 | A1* | 8/2017 | Belfiori | G06F 1/163 |
| 2017/0228025 | A1* | 8/2017 | Hall | G06F 3/017 |
| 2017/0242496 | A1* | 8/2017 | Park | G06F 3/0346 |

OTHER PUBLICATIONS

Office action dated Nov. 7, 2016 rejecting JPO application 2015-191532.*
Saponas et al, "Demonstrating the Feasibility of Using Forearm Electromyography for Muscle-Computer Interfaces" CHI 2008, Florence, Italy, Apr. 2008. (Year: 2008).*
Morganti et al, "A smart watch with embedded sensors to recognize objects, grasps and forearm gestures", International Symposium of Robotics and Intelligent Sensors 2012 (IRIS 2012), Procedia Engineering 41 (2012) 1169-1175. (Year: 2012).*
Chao Xu et al, "Finger-Writing with Smartwatch: A Case for Finger and Hand Gesture Recognition using Smartwatch", HotMobile 2015—16th International Workshop on Mobile Computing Systems and Applications : 9-14. Association for Computing Machinery, Inc. (Jan. 1, 2015). (Year: 2015).*
A ring-type wearable device "Ring", Wearable Tech Expo in Tokyo 2014, Mar. 25-26, 2014, 7 pages.
Kim et al., "Digits: Freehand 3D Interactions Anywhere Using a Wrist-Worn Gloveless Sensor", ACM Digital Library, Oct. 2012, pp. 167-176.

* cited by examiner

DETERMINING DIGIT MOVEMENT FROM FREQUENCY DATA

CROSS-REFERENCE TO RELATED APPLICATIONS

This patent application claims priority to Japan Patent Application No. JP2015-191532 filed on 29 Sep. 2015 for Susumu Shimotono, Yasushi Tsukamoto, Jun Luo, Hiroshi Itoh, and Ryohta Nomura, the entire contents of which are incorporated herein by reference for all purposes. See MPEP § 213.

FIELD

The subject matter disclosed herein relates to a portable information terminal, an information processing method, and a program for indirect determination of digit movement.

BACKGROUND

Recently, as a type of wearable terminal worn around a user's wrist, wristwatch type portable terminals, referred to herein as "smart watches", have launched one after another. Because a smart watch can be used by wearing it around the wrist like a wristwatch, it can be used without holding it with one's hand, in contrast to a smartphone or a cellular phone, hence attracting users by its convenience.

BRIEF SUMMARY

An apparatus for indirect determination of digit movement is disclosed. A method and computer program product also perform the functions of the apparatus.

The apparatus for indirect determination of finger movement includes a processor and a memory that stores code executable by the processor. The processor obtains frequency data corresponding to movement of a user's limb, extracts frequency data having a predetermined feature value from the measured frequency data; and determines from the extracted frequency data whether the movement of the limb corresponds to a predetermined digit motion.

In certain embodiments, the apparatus includes an acceleration sensor that measures translational movement, wherein obtaining frequency data corresponding to movement of user's limb comprises receiving frequency data from the acceleration sensor. In further embodiments, the apparatus also includes a gyro sensor that measures rotational movement, wherein obtaining frequency data corresponding to movement of user's limb comprises combining frequency data received from the acceleration sensor with frequency data received from the gyro sensor. In one embodiment, predetermined feature value is a preset frequency range. In another embodiment, the predetermined feature value is a magnitude that exceeds a threshold value.

In one embodiment, determining whether the movement of the limb corresponds to a predetermined digit motion comprises comparing the magnitude of the extracted frequency data to a threshold value. In another embodiment, determining whether the movement of the limb corresponds to a predetermined digit motion comprises determining whether the extracted frequency data matches a preset pattern.

In some embodiments, the processor further performs an action corresponding to the predetermined digit motion. In one embodiment, the action corresponding to the predetermined digit motion is a pointer control command.

In certain embodiments, the frequency data corresponding to movement of a user's limb includes a frequency corresponding to movement of a limb surface. In one embodiment, the limb is an arm and apparatus is located at a wrist of the user, wherein obtaining frequency data corresponding to movement of a user's limb comprises measuring movement of a surface of the wrist.

The method for indirect determination of finger movement includes obtaining, by use of a processor, frequency data corresponding to movement of a user's limb. The method also includes extracting frequency data having a predetermined feature value from the measured frequency data. The method further includes determining from the extracted frequency data whether the movement of the limb corresponds to a predetermined digit motion.

In certain embodiments, extracting frequency data having a predetermined feature value from the measured frequency data comprises extracting, from the frequency data, a frequency whose predetermined measured value is larger than or equal to a predetermined threshold value. In one embodiment, determining whether the movement of the limb corresponds to a predetermined digit motion comprises comparing the magnitude of the extracted frequency data to a threshold value. In another embodiment, determining whether the movement of the limb corresponds to a predetermined digit motion comprises determining whether the extracted frequency data matches a preset pattern.

In some embodiments, the method includes identifying an action corresponding to the predetermined digit motion and performing the action in response to determining that the movement of the limb corresponds to a predetermined digit motion. In certain embodiments, the frequency data corresponding to movement of a user's limb includes a frequency corresponding to movement of a limb surface.

The program product for indirect determination of finger movement includes a computer readable storage medium that stores code executable by a processor, the executable code comprising code to perform: measuring frequency data corresponding to movement of a user's limb, extracting frequency data having a predetermined feature value from the measured frequency data, determining from the extracted frequency data whether the movement of the limb corresponds to a predetermined digit motion, and performing an action corresponding the predetermined digit motion, in response to determining that the movement of the limb corresponds to the predetermined digit motion.

In certain embodiments, the limb is an arm and apparatus is located at a wrist of the user, wherein obtaining frequency data corresponding to movement of a user's limb comprises measuring movement of a surface of the wrist. In one embodiment, measuring frequency data corresponding to movement of a user's limb corresponds to receiving frequency data from an acceleration sensor that detects translational movement. In another embodiment, measuring frequency data corresponding to movement of a user's limb corresponds to receiving frequency data from a gyro sensor that detects rotational movement.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
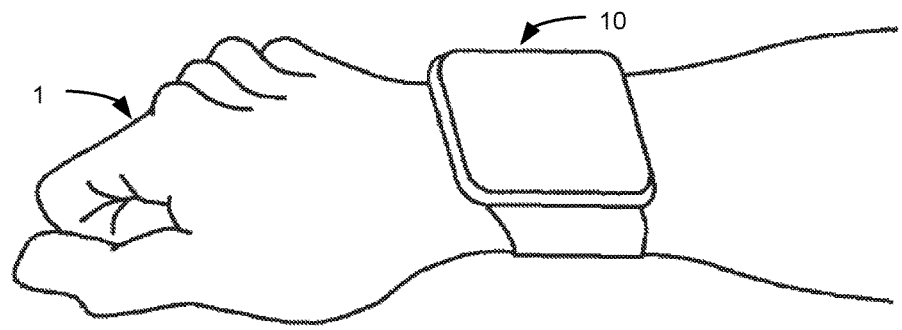
FIG. 1 is a diagram illustrating one embodiment of a user wearing a portable information terminal.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements. The same reference numerals are given to the same or corresponding parts in each drawing to simplify or omit the redundant description accordingly.

Generally, the disclosed embodiments describe a portable, wearable information terminal that measures frequency data corresponding to limb movement (e.g., arm or leg movement) and determines movement of a digit (e.g., a thumb, finger, or toe) corresponding to a predetermined action. Here, indirect determination of the movement of the desired target portion (e.g., the digit) is identified using data, such as frequency, obtained by sensing a portion away from the portion whose movement is to be detected (e.g., by sensing the limb). Thus, the disclosed apparatus, systems, methods, and program products are capable of recognizing a gesture, such as a finger gesture, with a convenient and simple mechanism. The portable information terminal in the embodiment described in various embodiments as a smart watch worn around an arm (e.g., a wrist) as an example, however, the disclosed embodiments are not limited to smart watches nor to devices worn around an arm or wrist.

FIG. 1 is a schematic diagram illustrating a portable information terminal 10 (here a smart watch) for indirect determination of digit movement worn around a person's wrist 1, according to embodiments of the disclosure. Although the wearing position of the smart watch (portable information terminal 10) is depicted as the wrist in FIG. 1, it is not limited to the wrist, and the wearing position may be an arm position closer to the elbow. Further, while the shape of the portable information terminal 10 is depicted as a square in FIG. 1, it is not limited to a square, and it may be any other shape such as a round shape, a rectangular shape, a trapezoidal shape, and the like.

A display unit, such as a liquid crystal display ("LCD") or light-emitting diode ("LED") display, is provided on the top face of the portable information terminal 10 to display a variety of information, and the like. In some embodiments, a touch panel is superimposed on the display unit to accept a user's touch operation. Accordingly, the display unit and touch panel may form a touchscreen display. In some embodiments, the portable information terminal 10 may have the functions of a smartphone or the like, such as the ability to place/receive calls (e.g., voice or video), the ability to send/receive messages (e.g., emails, text messaging, chat messages, etc.), the ability to playback media (e.g., music, photos, video), the ability to access data networks such as the Internet the ability to capture images, voice, etc., and the like. In other embodiments, the portable information terminal 10 may have a function to assist with operations on the smartphone in cooperation with the smartphone, even though the smart watch does not have all the functions of the smartphone.

Figure 2A:
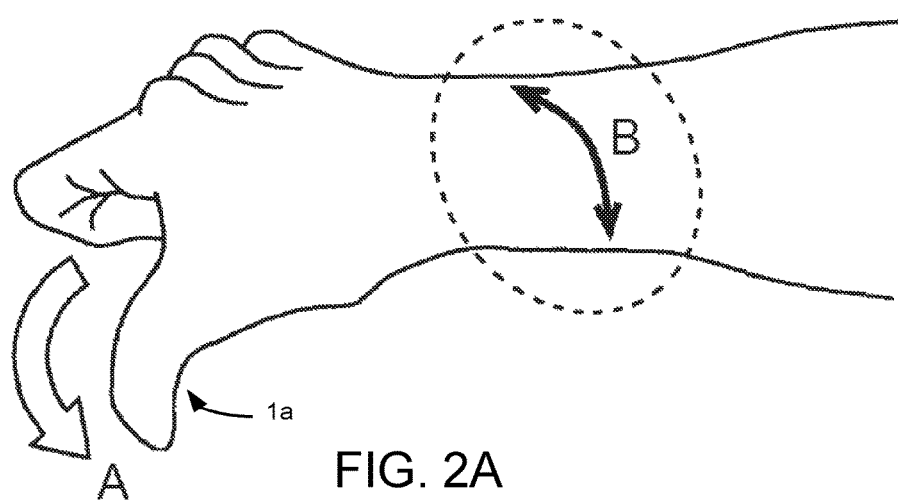
FIG. 2A is a diagram illustrating one example of the movement of an arm surface along with digit motion.
Figure 2B:
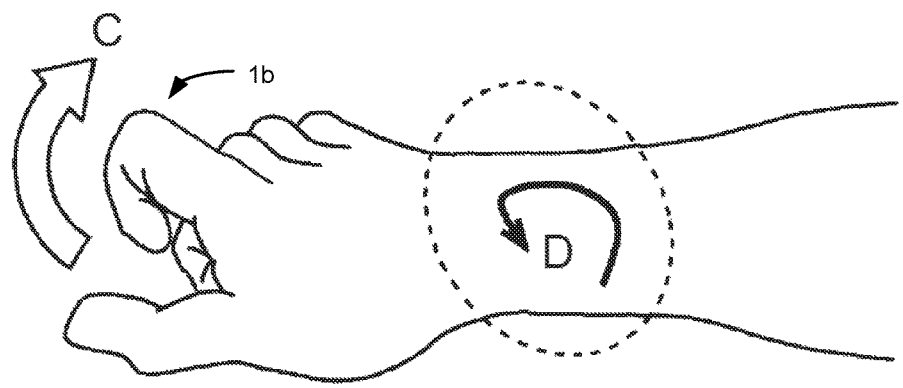
FIG. 2B is a diagram illustrating another example of the movement of an arm surface along with digit motion.

Referring next to FIGS. 2A-2B, when a person moves a digit (e.g., a thumb or finger), a wrist surface of an arm on the finger side moves along with the movement of the digit. Specifically, when a thumb 1a is poked out in the direction of arrow A as illustrated in FIG. 2A, the wrist surface indicated by the broken line moves up and down in the directions of arrow B. Additionally, when an index finger 1b is moved in the direction of arrow C as illustrated in FIG.

2B, the wrist surface indicated by the broken line moves counterclockwise in the direction of arrow D. Accordingly, when a digit is moved, the arm surface including the wrist exhibits specific movement corresponding to the motion of the digit, i.e., that there is a close link between the movement of the digit and the movement of the arm including the wrist.

As described herein, the motions of these wrist surfaces may be detected as frequencies using an acceleration sensor, a gyro sensor, and the like to determine the digit motion based on the detected frequencies. In other words, the disclosed embodiments measure the movement at the wrist (e.g., using sensors in the smart watch or other portable information terminal) and utilize the close link between the movement of a digit and the movement of a wrist to determine movement of the digit. Thus, the disclosed embodiments determine movement of the digit without directly measuring the movement of the digit. Rather, a frequency characteristic of digit movement is extracted from the movement of an arm including the wrist in order to determine the movement of the specific digit indirectly from the detected frequency.

In addition, the disclosed embodiments eliminate the bothersome requirements in the conventional techniques for a large-scale configuration and a sensor for each digit. For example, the portable information terminal 10 does not require a remark control device one around a finger to recognize finger motion (e.g., gestures) using the finger. As another example, the portable information terminal 10 does not require image sensors, infrared cameras, or the like one around the wrist to recognize a gesture made by the fingers. Rather, the portable information terminal 10 utilizes existing acceleration sensors and/or gyro sensors to enable intuitive operations with a digit(s) of one hand.

Figure 3:
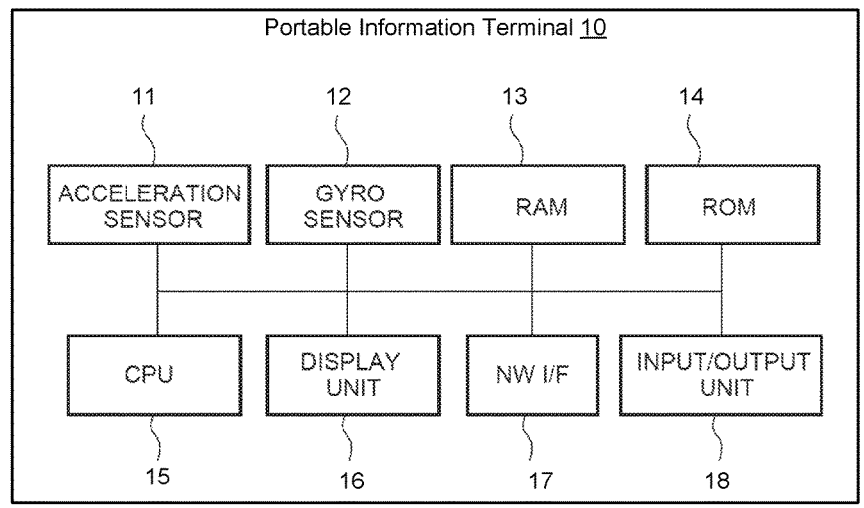
FIG. 3 is a block diagram illustrating one embodiment a hardware configuration of the portable information terminal.

FIG. 3 depicts a block diagram representative of a hardware configuration of the portable information terminal 10, according to embodiments of the disclosure. Note that the configuration described here is just an example, and the hardware configuration of the portable information terminal is not limited to this configuration. For example, portable information terminal may include additional hardware components not shown.

The portable information terminal 10 may be a smart watch, a heads up display, a fitness band, a mobile telephone, and the like. The hardware configuration of the portable information terminal 10 comprises an acceleration sensor 11, a gyro sensor 12, a RAM 13, a ROM 14, a CPU 15, a display unit 16, a network interface 17, and an input/output unit 18.

The acceleration sensor 11 is a sensor for measuring translational (e.g., linear) acceleration. As used herein, "translational acceleration" refers to acceleration due to a translational movement (e.g., as opposed to a rotational movement). In certain embodiments, the acceleration sensor 11 additionally performs signal processing and/or analysis to obtain information on tilt, movement, vibration, impact, and the like. For example, an MEMS (Micro Electro Mechanical Systems) acceleration sensor is common. The MEMS acceleration sensor is composed of a detection element unit and a signal processing circuit. As the detection types of detection element units, there are a capacitance detection type, a piezo-resistance type, and a heat detection type. Here, the acceleration sensor 11 is not limited to a particular detection type, and may be of any type suitable for measuring translational acceleration. In the embodiment, the motion of the arm in the vertical direction, in the horizontal direction, or in depth, or the movement of the arm surface is detected as a frequency by the acceleration sensor 11.

In one embodiment, the acceleration sensor 11 measures acceleration caused by displacement of the portable information terminal 10, for example due to movement of the surface of the wrist caused by finger motion as described above. In another embodiment, the acceleration sensor 11 measures acceleration caused by kinetic movement of the wrist through space, such as when the user walks from one point to another.

The gyro sensor 12 is a sensor for measuring rotation angular velocity, which measures the rotating motion of an object that cannot be measured by the acceleration sensor. As used herein, "rotation angular velocity" refers to a rate of change of angular displacement and specifies both an angular speed (also referred to as rotational speed) and an axis about which the rotation occurs. For example, a vibration gyro sensor using MEMS technology is common. In the embodiment, the rotating motion of the arm, around which the portable information terminal is attached, or of the arm surface is detected as a frequency by the gyro sensor 12. Note that the acceleration sensor 11 and the gyro sensor 12 may be combined to detect the movement of the arm itself or the movement of the arm surface.

In one embodiment, the gyro sensor 12 measures rotation angular velocity caused by displacement of the portable information terminal 10, for example due to movement of the surface of the wrist caused by finger motion as described above. In another embodiment, the gyro sensor 12 measures rotation angular velocity caused by kinetic movement of the wrist through space, such as when the user walks from one point to another.

The RAM (random access memory) 13 serves as a working memory or the like of a processing program executed by the portable information terminal 10 in the embodiment. For example, the RAM 13 may include, but it not limited to, dynamic RAM (DRAM), synchronous dynamic RAM (SDRAM), and/or static RAM (SRAM). The RAM 13 may store one or more of control algorithms, such as an operating system, for operating the portable information terminal 10, applications, user data, sensor data, and the like.

The ROM (read-only memory) 14 serves as a storage unit for storing the above processing program, frequencies measured by the respective sensors mentioned above, frequencies pre-stored to determine the contents of processing to be performed by the portable information terminal based on the degrees of matching with measured frequencies, table data defining the contents of processing corresponding to the measured frequencies, and the like.

The CPU (central processing unit) 15 receives the measurement results from the acceleration sensor 11 and the gyro sensor 12 to execute the above-mentioned processing program so as to control each of the functional units such as the display unit 16. It may be a microcomputer with a processing program incorporated therein. For example, the CPU 15 may be a microcontroller, a microprocessor, a graphics processing unit (GPU), an auxiliary processing unit, a FPGA, an integrated circuit, or similar controller. In certain embodiments, the CPU 15 may include multiple processing units, such as multiple processing cores, multiple microprocessors, multiple microcontrollers, or the like.

The display unit 16 is a display section which displays a variety of information such as text, numerals, symbols, and graphics. The display unit 16 may be any suitable electronically controllable display including, but not limited to, an LCD, an LED display, an organic LED ("OLED") display, and the like. In various embodiments, a touch panel for accepting a user's touch operation may be superimposed on, or combined with, the display unit 16.

The network interface 17 is an interface for communication connection with an external device through a communication network. In various embodiments, the network interface 17 establishes a wireless connection with the external device. However, in other embodiments the network interface 17 may communicate with the external device over a wired connection.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The input/output unit 18 includes, for example, a microphone for accepting sound input, a touch panel for accepting touch input as mentioned above, a speaker for outputting sound, and the like.

Figure 4:
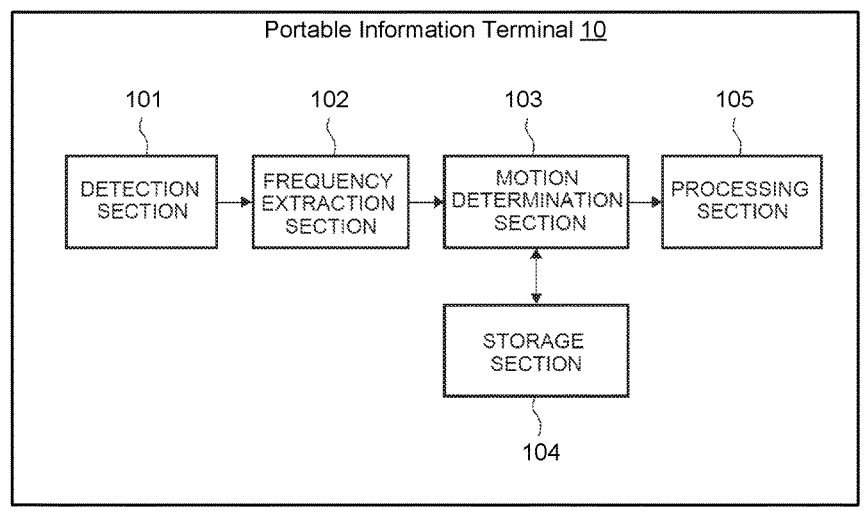
FIG. 4 is a functional block diagram illustrating one embodiment of the portable information terminal.

FIG. 4 depicts a functional block diagram of the portable information terminal 10, according to embodiments of the disclosure. The portable information terminal 10 in the embodiment includes, a detection module 101, a frequency extraction module 102, a motion determination module 103, a storage module 104, and a processing module 105. As discussed above, in certain the modules 101-105 may be implemented as hardware circuits, for example as discrete components within the portable information terminal 10. In other embodiments, the modules 101-105 may be implemented in code and/or software for execution on the CPU 15. In various embodiments, the modules 101-105 may be implemented as a combination of hardware circuitry and software code.

The detection module 101 detects a frequency corresponding to the movement of a person's arm. The detected frequency may be a combination of frequency from translational movement captured using the acceleration sensor 11 and frequency from rotational movement captured using the gyro sensor 12. The detection module 101 detects a frequency corresponding to the movement of the arm or a frequency corresponding to the movement of an arm surface. In certain embodiments, the function of the detection module 101 may be implemented, for example, using the acceleration sensor 11, the gyro sensor 12, or a combination of these sensors as discussed above with reference to FIG. 3. For example, the detection module 101 may compile data received from the acceleration sensor 11 and/or the gyro sensor 12 to obtain the frequency (e.g., frequency data) corresponding to movement of an arm (e.g., movement of the arm surface).

As used herein, the "frequency corresponding to the movement of the arm" refers to a frequency derived from a multi-axis data measurement. For example, the multi-axis data measurement may be a six-axis measurement assessing translational movement in three axes (e.g., a vertical direction, a first horizontal direction orthogonal to the vertical direction, and a second horizontal direction orthogonal to the first horizontal direction) and assessing rotational movement around the three axes. As discussed above, the acceleration sensor 11 may measure translational movement in three axes, while the gyro sensor 12 may measure rotational movement about the three axes.

The frequency extraction module 102 extracts a frequency having a predetermined feature value from among frequencies detected by the detection module 101. In one embodiment, the function of the frequency extraction module 102 may be implemented by loading a motion program (e.g., stored in the ROM 14 or the like) that extracts frequency features into the RAM 13 and executing the motion program on the CPU 15. The frequency extraction module 102 extracts a frequency having a predetermined feature value obtained by analyzing the six-axis sensing data measured based on the acceleration sensor, the gyro sensor, or the combination of these sensors as mentioned above.

As used herein, the "predetermined feature value" refers to a characteristic waveform or the like, different from a normal waveform or the like with a frequency obtained, for example, when an arm or a hand is moved in an offhand manner. Here the frequency data corresponding to normal movement (e.g., from pulse in the wrist, from walking, from standing, etc.) is noise while the frequency having the predetermined feature value is the desired signal. Thus, the frequency extraction module 102 extracts the frequency having the predetermined feature value from the noise, for example by filtering out frequency data corresponding to normal (e.g., non-gesture) movement.

In certain embodiments, the frequency extraction module 102 extracts, from among the frequencies detected by the detection section, a frequency whose predetermined measured value is larger than or equal to a predetermined threshold value. In certain embodiments, the frequency extraction module 102 extracts a frequency having the predetermined feature value obtained as a result of respectively analyzing six-axis sensing data measured based on the acceleration sensor, the gyro sensor, or the combination of these sensors. In certain embodiments, the detection module 101 at least detects a frequency corresponding to the movement of the arm itself or a frequency corresponding to movement of an arm surface.

After the frequency extraction module 102 extracts the frequency of the predetermined feature value, the motion determination module 103 determines whether the predetermined feature value is approximate to a pre-stored feature value. As used herein, the term "approximate" includes the concept that the feature value of the extracted frequency coincides with the stored feature value, that the feature value of the extracted frequency falls within a stored, predetermined range of feature values, and the like.

In response to the measured feature value of the predetermined feature being approximate to the pre-stored feature value, the motion determination module 103 determines that the user has performed a predetermined digit motion associated with the pre-stored feature value. As used herein, the "predetermined digit motion" refers to a special motion or gesture different from motion usually performed. The predetermined digit motion may be distinguished from the usual motion, by the measured feature value being within a certain range, exceeding (or not exceeding) certain thresholds, and the like. For example, if an intuitive operation such as a touch operation conventionally performed on a touch panel is preset as special or subtle motion, the user can manipulate the portable information terminal easily with the feeling of a familiar operation. The details of this processing will be described below with reference to FIG. 5.

Figure 6:
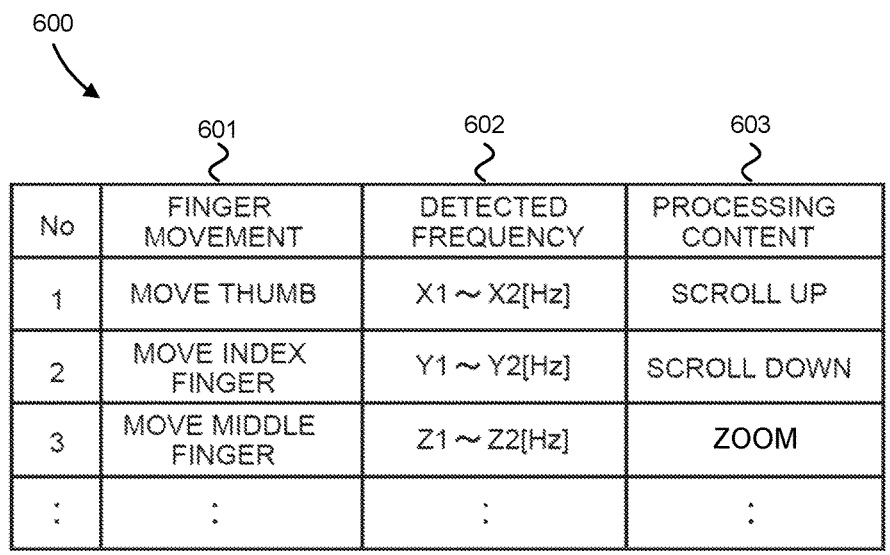
FIG. 6 is a table illustrating one embodiment of the contents of processing to be performed according to specific digit motion.

The storage module 104 accesses a stored table in which special motion as predetermined digit motion, different from motion usually performed, is associated with a pre-stored feature value. The store table further associates the predetermined digit motion with processing content. One example of a stored table accessible by the storage module 105 is depicted in FIG. 6. In one embodiment, the function of the storage module 104 may be implemented, for example, using the ROM 14 or the like. In certain embodiments, the storage module 104 identifies processing content (e.g., an action to be performed) from the stored table.

In certain embodiments, the stored table may not be provided in the portable information terminal. For example, as in recent cloud computing systems, an external storage device connected through a network may store the table, so that the storage module 104 acquires data, such as the frequency, from the external storage device through the network when necessary. The details of the table will be described below with reference to FIG. 6. Based on the table accessed by the storage module 104, the motion determination module 103 determines that the special or subtle motion is performed.

The frequency extraction module 102 extracts a frequency having a predetermined feature value from among frequencies detected by the detection module 101. For example, a frequency whose predetermined measured value is larger than or equal to a predetermined threshold value is extracted. The motion determination module 103 determines whether the extracted frequency corresponds to a predetermined digit motion. Thus, the determination is made by focusing on the movement of a digit or an arm to be determined and the other frequencies based on the other regular motion is excluded from the determination so that false positives due to the regular motion can be prevented. For example, even when the user pokes out the thumb 1a in the direction of arrow A as illustrated in FIG. 2A while walking with his or her arms swinging back and forth, it can make it easy to determine only the motion of poking out the thumb 1a in the direction of arrow A to be determined. Alternatively, the frequency extraction module 102 may extract a predetermined number of frequencies detected by the detection module 101.

The processing module 105 performs processing associated with the digit motion determined by the motion determination module 103. In one embodiment, the function of the processing module 105 may be implemented by the CPU 15 accessing a lookup table in the RAM 13 and/or ROM 14. In certain embodiments, the processing module 105 identifies processing content (e.g., an action to be performed) from the stored table accessed by the storage module 104. In other embodiments, the storage module 104 indicates to the processing module 105 the processing content (e.g., the action to be performed). Examples of processing content include, but are not limited to, input commands, pointer control commands (e.g., a command relating to cursor motion, scroll motion, button click action, and the like), system commands, menu selection, launching particular applications, checking for messages, initiating a call, and the like.

Figure 5:
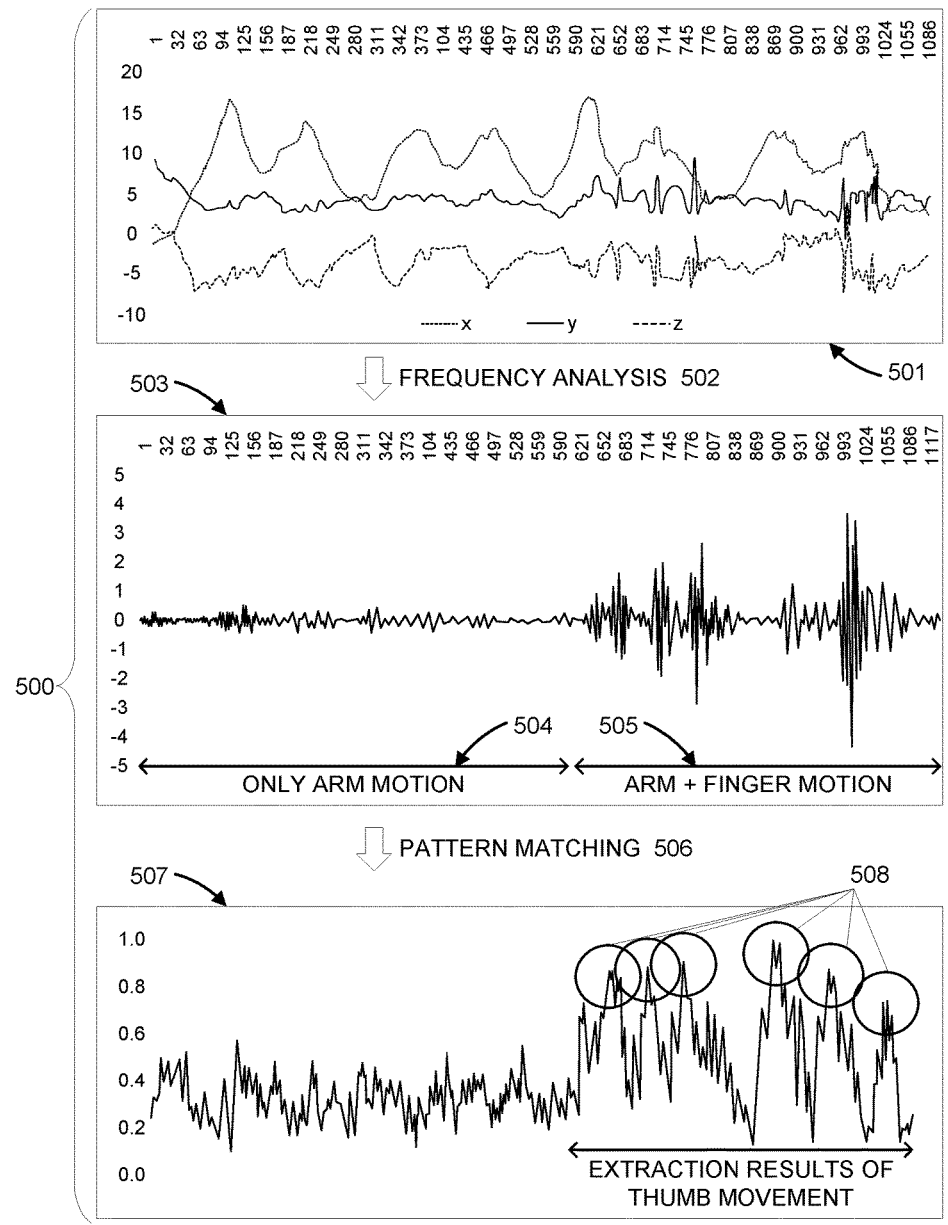
FIG. 5 contains data charts illustrating one embodiment of frequency analysis for extracting specific digit motion.

FIG. 5 depicts processing data 500 to indirectly determine movement of a desired target portion, according to embodiments of the disclosure. Processing the data 500 includes extracting a frequency having a predetermined feature value from among frequencies, for example detected by the acceleration sensor 11 and the gyro sensor 12. Processing the data 500 also includes determining the movement of a predetermined digit based on the extracted frequency. Here, description will be made using an example of determining the motion of a thumb while swinging an arm, but it is just an example.

Data chart 501 illustrates frequencies when an arm is moved in respective X-, Y-, and Z-axis directions as frequencies detected by the respective sensors (e.g., acceleration sensor 11 and gyro sensor 12). Data chart 501 represents unprocessed data. The portable information terminal 10 performs a frequency analysis 502 on the data chart 501.

Data chart 503 illustrates the results of analyzing the measured frequencies illustrated in data chart 501 and extracting feature portions by processing, such as filtering. Here, the data chart 503 includes, on the left side, a non-characteristic waveform 504 that indicates only the presence of limb motion (here, an arm). The data chart 503 additionally includes, on the right side, a characteristic waveform 505 appearing when the arm and the digit (here, a finger) are moved at the same time.

The portable information terminal 10 then performs pattern matching 506 on the data chart 503. Data chart 507 illustrates the results of the pattern matching. Here, data chart 507 depicts the case where waveform data indicating the movement of the finger extracted by pattern matching processing based on the characteristic waveform illustrated in data chart 503. Thus, according to the embodiment, the frequencies measured by the respective sensors and the like incorporated in the portable information terminal worn around the arm or wrist are analyzed to enable the determination on the movement of a finger despite the presence of arm motion.

FIG. 6 depicts a stored data table 600 according to embodiments of the disclosure. The data table 600 is correlates finger movement 601 with detected frequencies 602. The data table 600 further correlates the finger movement 601 with processing content 603. As discussed above, the processing module 105 implements the processing content 603, causing the portable information terminal to work in response to the specific finger movement. Note that FIG. 6 just illustrates an example, and the processing content can be made to correspond to the number of detected characteristic frequencies.

In response to the motion determination module 103 determining that predetermined finger movement 601 associated with a feature value is performed, the storage module 104 accesses the data table 600. Thereafter, the storage module 104 and/or the processing module 105 identify processing content 603 associated with the identified finger movement 601. Thereafter, the processing module 105 implements the processing content, thereby performing one or more actions corresponding to specific finger movement 601 based on the table data 600 accessed by the storage module 104.

As depicted, a first entry in the data table 600 associates the finger movement "Move Thumb" with the frequencies "X1 to X2 [Hz]" and with the processing content "Scroll Up." Accordingly, upon detecting frequencies between X1 and X2 that meet predetermined criteria, the portable information terminal 10 determines that the user has moved the thumb and performs the associated action of scrolling up in response to the thumb movement. Also as depicted, a second entry in the data table 600 associates the finger movement "Move Index Finger" with the frequencies "Y1 to Y2 [Hz]" and with the processing content "Scroll Down." Upon detecting frequencies between Y1 and Y2 that meet predetermined criteria, the portable information terminal 10 determines that the user has moved the index finger and performs the associated action of scrolling down in response to the index finger movement.

As further depicted, a third entry in the data table 600 associates the finger movement "Move Middle Finger" with the frequencies "Z1 to Z2 [Hz]" and with the processing content "Zoom." Accordingly, upon detecting frequencies between Z1 and Z2 that meet predetermined criteria, the portable information terminal 10 determines that the user has moved the middle finger and performs the associated zoom action in response to the middle finger movement. Although only the movements associated with a single digit are illustrated in FIG. 6, the movement of the arm itself may also be combined therewith. Even in the case of only the digits, a frequency corresponding to the movement of a combination of two or more digits such as the thumb and the index finger may be set. This can increase the kind of processing content to be processed on the portable information terminal.

Figure 7:
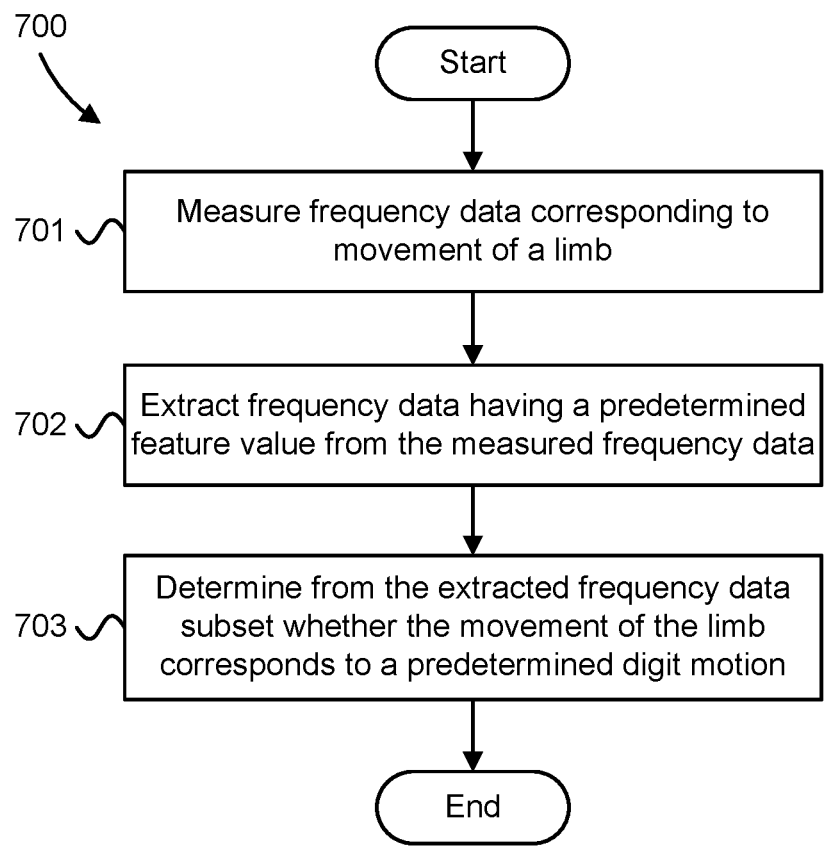
FIG. 7 is a schematic flowchart illustrating one embodiment of a method for indirect determination of digit movement.

FIG. 7 depicts a method 700 for indirect determination of digit movement according to embodiments of the disclosure. In one embodiment, the method 700 is performed by the portable information terminal 10. Alternatively, the method 700 may be performed by a processor and a computer readable storage medium, such as the CP 15 and RAM 13. The computer readable storage medium may store code that is executed on the processor to perform the functions of the method 700.

The method 700 begins and measures 701 frequency data corresponding to movement of a limb. In one embodiment, the detection module 101 measures a frequency corresponding to movement of a limb using sensor output from the acceleration sensor 11 and/or the gyro sensor 12.

The method 700 extracts 702 frequency data having a predetermined feature value from the measured frequency data. In one embodiment, the frequency extraction module 102 extracts 702 a subset of the frequency data having the predetermined feature value. The predetermined feature value may be a predetermined waveform, predetermined frequency range, and the like.

The method 700 determines 703 from the extracted frequency data subset whether the movement of the limb corresponds to a predetermined digit motion. In one embodiment, the motion determination module 103 analyzes the extracted frequency data to determine 703 whether the movement of the limb corresponds to a predetermined digit motion. For example, the motion determination module 103 may determine that the limb movement corresponds to a predetermined digit motion when the extracted frequency data has a magnitude value above a threshold value, when the extracted frequency data matches a preset pattern, or the like. In certain embodiments, determining 703 whether the movement of the limb corresponds to a predetermined digit motion includes identifying a specific digit involved in the predetermined digit motion. In various embodiments, the method 700 includes identifying an action corresponding to the predetermined digit motion and implementing the action.

Various embodiments can be provided without departing from the gist of the present disclosure. For example, each processing on the portable information terminal of the aforementioned embodiment can be performed in hardware or software, or in a combination of both. When the processing is performed using software, a program with a processing sequence recorded therein can be installed in a memory of a computer incorporated in dedicated hardware and executed. Alternatively, the program can be installed and executed on a general-purpose computer capable of executing various processes.

Further, in the embodiment, although the description is made of indirect determination of the movement of a digit based on a frequency detected from a wrist distant from the digit and corresponding to the movement of the wrist, the present disclosure is not limited thereto. The disclosed embodiments can also be applied to various use scenarios, in which indirect determination of the movement of a desired target portion based on data such as a frequency obtained by sensing a portion away from the portion whose movement is to be detected is useful. For example, the present disclosure is also applicable to a use scenario where movement at a foot, ankle or lower leg is monitored to determine the movement of one or more toes, a use scenario where movement at a thigh or the like is monitored to determine the movement of a foot, a use scenario where movement at a neck portion is monitored to determine facial movement, or any other scenario where movement at a body portion is monitored to determine the movement of an arm or a leg.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a movement sensor that captures multi-axis movement data corresponding to movement of a user's limb, the movement corresponding to at least one of: translational movement of a sensor and rotational movement of the sensor;
   a processor;
   a memory that stores code executable by the processor to:
   extract one or more frequency features from the multi-axis movement data;
   extract digit movement data from the extracted one or more frequency features, wherein extracting digit movement data comprises extracting frequency data having a predetermined feature value from the extracted one or more frequency features; and
   determine from the extracted digit movement data whether the multi-axis movement data corresponds to a predetermined motion of a digit.

2. The apparatus of claim 1, wherein the movement sensor comprises an acceleration sensor that measures translational movement on multiple axes, wherein capturing multi-axis movement data corresponding to movement of a user's limb comprises receiving frequency data from the acceleration sensor.

3. The apparatus of claim 2, wherein the movement sensor comprises a gyro sensor that measures rotational movement, wherein capturing multi-axis movement data corresponding to movement of a user's limb comprises combining frequency data received from the acceleration sensor with frequency data received from the gyro sensor.

4. The apparatus of claim 1, wherein the predetermined feature value is a preset frequency range.

5. The apparatus of claim 1, wherein determining whether the multi-axis movement data corresponds to a predetermined motion of a digit comprises comparing the magnitude of the extracted digit movement data to a threshold value.

6. The apparatus of claim 1, wherein determining whether the multi-axis movement data corresponds to a predetermined motion of a digit comprises determining whether the extracted digit movement data matches a preset pattern.

7. The apparatus of claim 1, wherein the processor further performs an action corresponding to the predetermined motion of a digit.

8. The apparatus of claim 7, wherein the action corresponding to the predetermined motion of a digit is a pointer control command.

9. The apparatus of claim 1, wherein the one or more frequency features include a frequency corresponding to movement of a limb surface.

10. The apparatus of claim 1, wherein the limb is an arm and the apparatus is located at a wrist of the user, wherein capturing multi-axis movement data corresponding to movement of a user's limb comprises measuring movement of a surface of the wrist.

11. A method comprising:
captures multi-axis movement data corresponding to movement of a user's limb, the movement corresponding to at least one of: translational movement of a sensor and rotational movement of the sensor;
extracting, by use of a processor, one or more frequency features from the multi-axis movement data;
extracting digit movement data from the extracted frequency features, wherein extracting digit movement data comprises extracting frequency data having a predetermined feature value from the extracted frequency features; and
determining from the extracted digit movement data whether the multi-axis movement data corresponds to a predetermined motion of a digit.

12. The method of claim 11, wherein extracting frequency data having a predetermined feature value from the extracted frequency features comprises extracting, from the frequency features, a frequency whose predetermined feature value is larger than or equal to a predetermined threshold value.

13. The method of claim 11, wherein determining whether the multi-axis movement data corresponds to a predetermined motion of a digit comprises comparing the magnitude of the extracted digit movement data to a threshold value.

14. The method of claim 11, wherein determining whether the multi-axis movement data corresponds to a predetermined motion of a digit comprises determining whether the extracted digit movement data matches a preset pattern.

15. The method of claim 11, further comprising:
identifying an action corresponding to the predetermined motion of a digit; and
performing the action in response to determining that the multi-axis movement data corresponds to a predetermined motion of a digit.

16. The method of claim 11, wherein the one or more frequency features include a frequency corresponding to movement of a limb surface.

17. A program product comprising a computer readable storage medium that is not a transitory signal and that stores code executable by a processor, the executable code comprising code to:
measure, at an apparatus, multi-axis movement data corresponding to movement of a user's limb, the movement corresponding to at least one of: translational movement of a sensor and rotational movement of the sensor;
extract one or more frequency features from the multi-axis movement data;
extract digit movement data from the extracted frequency features, wherein extracting digit movement data comprises extracting frequency data having a predetermined feature value from the extracted frequency features;
determine from the extracted digit movement data whether the multi-axis movement data corresponds to a predetermined motion of a digit; and
perform an action corresponding the predetermined motion of a digit, in response to determining that the movement of the limb corresponds to the predetermined motion of a digit.

18. The program product of claim 17, wherein the limb is an arm and the apparatus is located at a wrist of the user, wherein extracting one or more frequency features from the multi-axis movement data comprises measuring movement of a surface of the wrist.

19. The program product of claim 17, wherein measuring multi-axis movement data corresponding to movement of a user's limb corresponds to receiving frequency data from an acceleration sensor that detects translational movement, wherein extracting one or more frequency features from the multi-axis movement data comprises extracting a frequency feature from translational acceleration data captured in multiple axes.

20. The program product of claim 17, wherein measuring multi-axis movement data corresponding to movement of a user's limb corresponds to receiving frequency data from a gyro sensor that detects rotational movement, wherein extracting one or more frequency features from the multi-axis movement data comprises extracting a frequency feature from rotational velocity data captured in multiple axes.

* * * * *